United States Patent

Newman, Jr. et al.

[15] 3,645,838

[45] Feb. 29, 1972

[54] RIGID MULTILAYER FORMED SHEET STRUCTURES

[72] Inventors: Ritchey O. Newman, Jr., Midland; Walter J. Schrenk, Bay City, both of Mich.

[73] Assignee: The Dow Chemical Company, Midland, Mich.

[22] Filed: Feb. 2, 1970

[21] Appl. No.: 8,058

[52] U.S. Cl. ............................. 161/164, 161/243, 161/253, 161/254, 161/255, 161/256
[51] Int. Cl. ................ B32b 00/00, B32b 25/12, B32b 27/08
[58] Field of Search ................. 161/253, 252, 254, 255, 256, 161/164, 242, 243

[56] References Cited

UNITED STATES PATENTS

| | | | |
|---|---|---|---|
| 2,601,318 | 6/1952 | Navikas | 161/253 X |
| 3,131,069 | 4/1964 | Goller et al. | 161/252 X |
| 3,242,038 | 3/1966 | Dallas et al. | 161/253 X |

*Primary Examiner*—Harold Ansher
*Assistant Examiner*—C. B. Cosby
*Attorney*—Griswold & Burdick, Merlin B. Davey and Lloyd E. Hessenaur, Jr.

[57] ABSTRACT

This invention provides economical multilayer sheets that combine high-barrier layers with layers of rigid polyvinyl chloride or impact polystyrene.

5 Claims, No Drawings

RIGID MULTILAYER FORMED SHEET STRUCTURES

BACKGROUND OF THE INVENTION

Rigid formed containers are of many types and sizes and are formed, filled and closed by a number of methods. When made from sheet of any single polymer or copolymer they are limited to the characteristics of that material.

SUMMARY OF THE INVENTION

This invention provides multilayer sheets for making rigid formed containers. More particularly, the invention provides five-layer rigid sheets comprising an inner barrier layer, juxtaposed glue layers on both sides of the barrier layer and outer layers of rigid polyvinyl chloride or impact polystyrene, said outer layers having an ASTM D-790 flexural modulus of at least 150,000 p.s.i. The sheet materials advantageously have a total thickness of 5 to 100 mils, preferably about 7 to 80 mils.

Any unvulcanized natural or synthetic rubber which is soluble in monomeric styrene, or can be rendered soluble in styrene, e.g., by milling on compounding rolls, and contains at least one free olefinic linkage per two basic units in the rubber polymer molecule, may be used in making high-impact styrene polymers which are useful in this invention. By basic unit is meant the radical making up the rubber molecule, which in the case of natural rubber is the isoprene radical $(C_5H_6)_n$ having in its combined form one olefinic linkage per isoprene radical. In the case of synthetic GRS-type rubber, the basic unit is the radical corresponding to the conjugated olefin, e.g., butadiene, chemically combined in the rubber molecule.

The outer layers can be from 2.5 to 40 mils thick and are preferably from about 25 to 30 mils thick.

A wide variety of barrier materials may be employed in the central layer of films in accordance with the present invention. Particularly suited as barrier layers are combinations of vinylidene chloride polymers, vinyl chloride polymers, vinylidene fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid, methyl alpha-chloro-acrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malenate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or saran combinations are acetyl tributyl citrate, epoxidized soybean oil (commercially available under the trade designation of Paraplex G-60), dibutyl sebacate, and polymeric plasticizers such as, for example, certain copolymers of ethylene and vinyl acetate.

The barrier layer can be from 0.5 to 35 mils in thickness and is most advantageously from 1.5 to 20 mils thick.

The adhesive layer may vary in thickness from 0.2 to 5.0 mils, however, generally the preferred adhesive layer thickness is about 2.0 mils. Oftentimes the strength of the bond between the inner or core layer and the outer or surface layer increases slowly as the thickness of the adhesive layer is increased, and generally little or no increase in the bond strengths occurs after the thickness of the bonding layer has reached about 2.0 mil.

A wide variety of polymers and polymeric compositions are useful to increase the adhesion between the rigid outer layer and the inner barrier layer. Suitable polymers or polymeric compositions are readily selected by determining the bonding strength of the composition being evaluated by forming a two-layer extrusion. The bond strength of the two-layer laminate is readily determined by conventional peel strength tests.

Adhesives which may be employed are copolymers of ethylene and vinyl acetate, advantageously in proportions of from 14 weight percent to 40 weight percent vinyl acetate with from 86 weight percent to 60 weight percent ethylene, copolymers of ethylene and ethylacrylate advantageously in proportions of from 20 to 30 weight percent ethylacrylate with from 80 to 70 weight percent ethylene, copolymers of ethylene with isobutyl acrylate, advantageously in proportions of from 20 to 30 weight percent isobutyl acrylate with from 80 to 70 weight percent of ethylene and chlorinated polyethylene, advantageously containing from 15 to 40 weight percent chlorine. A particularly preferred adhesive is a block copolymer of styrene and butadiene. Blends of such adhesive materials may also be employed.

The sheets of this invention are ideally suited for making containers of a variety of forms for products that are sensitive to oxygen, carbon dioxide or moisture, products that have an elusive fragrance that is desirably retained, products that may pick up unwanted odors from the environment or products that contain highly volatile components. Products advantageously packaged in the sheet material of this invention include, for example, cheese, butter, steroids, various medicines, dried foods and the like. A preferred use of the sheet material is making drug blisters for the protection of medicinal tablets from the deleterious effects of moisture, oxygen and carbon dioxide.

The invention is further illustrated by the following examples.

EXAMPLE 1

A five-layer film was prepared by the coextrusion of outer layers of a medium-impact polystyrene having a flexural modulus of about 350,000 and comprising 3.5 weight percent of a copolymer of 76.5 weight percent butadiene and 23.5 weight percent styrene having a solution viscosity (5 percent in styrene at 25° C.) of 70 ± centipoises, 3.5 weight percent mineral oil, 0.2 weight percent di-t-butyl-p-cresol and the balance styrene, a core layer comprising 96 parts by weight of a copolymer of 85 weight percent vinylidene chloride and 15 weight percent vinyl chloride, 3 parts by weight of a copolymer of 67 weight percent ethylene and 33 weight percent vinyl acetate having a melt index of 22-28 and a density at 23° C. of 0.957 and 1 part by weight of tetrasodium pyrophosphate and glue layers comprising a styrene-butadiene block copolymer commercially available under the trade designation Kraton 2104. The outer layers had a thickness of 6.1 mils, the core layer had a thickness of 2.3 mils and the glue layers were 1.6 mils thick.

Peel adhesion tests were carried out according to ASTM D-903-49 except that a crosshead testing speed of 5.0 inches per minute was used. The 180° peel test did not proceed satisfactorily because of the inability of the outer skin to be pulled at a 180° angle. Consequently, one outer layer was physically separated from the remaining composite and was inserted in the upper jaw of the Instron Tensile Tester with the remaining part of the composite structure being placed in the lower tester jaw. This allowed the unseparated portion of the specimen to lie in a plane approximately 90° to the direction of pull. Peel tests were then completed using a jaw span of 2.0 inches. The peel adhesion, in pounds per inch of width, was in the range of 2.8-4.1, average 3.5. While the initial separation was between the outer layer and the glue layer, at times the separation would be between the glue layer and the core layer, indicating that the adhesion in the two interfaces was about equal.

EXAMPLE 2

The above experiment was repeated except that the glue layers comprised a copolymer of 72 weight percent ethylene and 28 weight percent vinyl acetate having a melt index of 6.0. In this example the outer layers were 4.0 mils thick, the core layer was 1.9 mils thick and the glue layers were 0.9 mil thick. The peel adhesion, in pounds per inch of width, was in the range of 0.7 to 0.8, average 0.77.

EXAMPLE 3

The above experiments were repeated except that the core layer was 1.60 mils thick and comprised 93.75 parts by weight of a copolymer of 85 weight percent vinylidene chloride and 15 weight percent vinyl chloride, 4.50 parts by weight of acetyltributyl citrate, 1 part by weight of an epoxidized soybean oil commercially available under the trade designation Paraplex G-60 and 0.75 part by weight of 4-tertiarybutyl salol, the glue layers comprised the copolymer employed in Example 2 and were 0.35 mil thick and the outer layers each comprised a 2.60 mil thick layer of a propylene-modified polyvinyl chloride commercially available under the trade designation "Airco 400" and having a flexural modulus of about 472,000. The moisture vapor transmission characteristic for this material was 0.138 grams/100 sq. in. in 24 hours and the adhesion between layers was good.

We claim:
1. A rigid multilayer sheet comprising an inner barrier layer, juxtaposed glue layers on each side of said barrier layer and outer layers, said outer layers comprising medium- or high-impact polystyrene having an A.S.T.M. D-790 flexural modulus of at least 150,000 p.s.i. and that contain a natural or synthetic rubber-type additive, said barrier layer comprising a copolymer of vinylidene chloride and a remainder of one or more olefinically unsaturated monomers copolymerizable therewith, said glue layers comprising a block copolymer of styrene and butadiene, said rigid multilayer sheet adapted for thermoforming into a rigid container or containers for packaging food products or drugs.

2. The rigid multilayer sheet of claim 1 wherein a copolymer of ethylene and vinyl acetate is blended with said block copolymer of styrene and butadiene to form said glue layers.

3. The rigid multilayer sheet of claim 1 wherein a copolymer of ethylene and ethylacrylate is blended with said block copolymer of styrene and butadiene to form said glue layers.

4. The rigid multilayer sheet of claim 1 wherein a copolymer of ethylene and isobutyl acrylate is blended with said block copolymer of styrene and butadiene to form said glue layers.

5. The rigid multilayer sheet of claim 1 wherein a polymer of chlorinated polyethylene is blended with said block copolymer of styrene and butadiene to form said glue layers.

* * * * *